No. 792,187. PATENTED JUNE 13, 1905.
W. A. ABBETT.
CALF WEANER MUZZLE.
APPLICATION FILED OCT. 24, 1904.
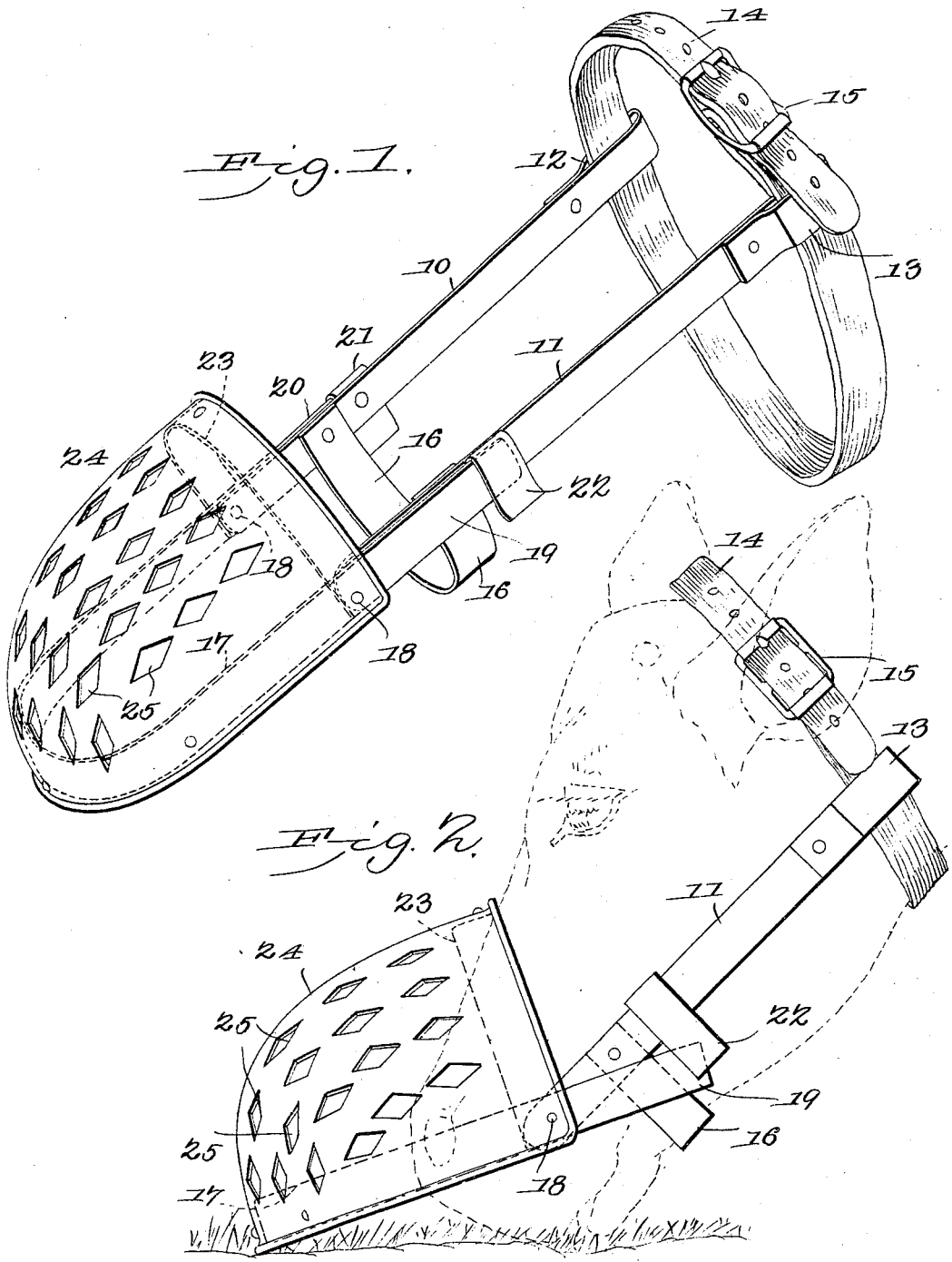
Witnesses
E. F. Stewart
C. N. Woodward.
William A. Abbett, Inventor,
by C. A. Snow & Co
Attorneys No. 792,187.

Patented June 13, 1905.

UNITED STATES PATENT OFFICE.

WILLIAM A. ABBETT, OF BLANCH, MISSISSIPPI.

CALF-WEANER MUZZLE.

SPECIFICATION forming part of Letters Patent No. 792,187, dated June 13, 1905.

Application filed October 24, 1904. Serial No. 229,780.

*To all whom it may concern:*

Be it known that I, WILLIAM A. ABBETT, a citizen of the United States, residing at Blanch, in the county of Scott and State of Mississippi, have invented a new and useful Improvement in Calf-Weaner Muzzles, of which the following is a specification.

This invention relates to muzzles worn by young animals to prevent them from nursing the mother animals while being weaned, and has for its object to produce a device of this character of improved construction and increased efficiency.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a perspective view of the improved device. Fig. 2 is a side view of the same, showing the position while the animal is feeding.

The improved device may be employed upon any of the various species of animals upon which devices of this class are required to be used, but is more particularly for use upon calves and like animals, and consists of two spaced cheek-bars 10 11, preferably metal, having loops 12 13 at one end to receive a strap 14, of leather or the like, for encircling the neck of the animal in the rear of the ears, as indicated in Fig. 2, the strap having a buckle 15 to provide for the proper adjustment of the same. Connecting the bars 10 11 near their forward ends is a loop 16, preferably of metal, for passing beneath the chin of the animal.

A U-shaped member 17 is mounted to swing, as at 18, from the free ends of the side members 10 11, the pivot-points 18 being spaced from the rear ends of the member 17, the extensions 19 20 thus produced for movably engaging stop-lugs 21 22 upon the side bars 10 11.

The U-shaped member 17 is connected near or at the pivoted point 18 by a loop 23, extending over the nose of the animal, and with a muzzle member or nose-hood 24, connected to the forward portion of the member 17 and to the loop 23.

The muzzle member and the members 17 and 23, connected therewith, are thus free to swing upwardly upon the pivot-points 18, but are limited in the downward movement by the stop-lugs 20 21, as will be obvious.

The U-shaped member 17 is long enough to extend for a considerable distance in advance of the nose of the animal, as indicated in Fig. 2, and will thus not interfere with the animal's feeding either from the ground or from grasping food from an elevated point, as the muzzle when in its lowest position, as in Fig. 1, is still above the line of the mouth of the animal. Thus the presence of the muzzle will not interfere with the animal's movement in feeding in the ordinary manner, but will effectually prevent it from nursing the mother animal, as will be obvious.

All the parts will be of metal except the strap 14, the muzzle member being "struck up" from sheet metal and provided with ventilating-apertures, as at 25.

The device can be manufactured cheaply and will be very strong and durable.

Having thus described the invention, what is claimed is—

A calf-weaner comprising two rigid cheek-bars having strap-receiving loops at their rear ends and connected and spaced near their front ends by a rigid U-shaped chin-loop, said cheek-bars being provided on their outer sides with downturned stop-lugs; a rigid U-shaped muzzle-supporting member having side bars connected pivotally with the cheek-bars, extended rearwardly of their pivotal points and engaging the downturned stop-lugs; a rigid nose-loop spacing and connecting the sides of the muzzle-supporting member, and a muzzle or nose-hood connected with the muzzle-supporting member and with the nose-loop; in combination with attaching means consisting of a neck-engaging strap extending through the loops at the rear ends of the cheek-bars.

In testimony that I claim the foregoing as my own I have hereto affixed my signature in the presence of two witnesses.

WILLIAM A. ABBETT.

Witnesses:
S. H. KIRKLAND,
F. F. MIZE.